US006266729B1

United States Patent
Leung et al.

(10) Patent No.: US 6,266,729 B1
(45) Date of Patent: *Jul. 24, 2001

(54) COMPUTER FOR ENCAPSULATING LEGACY DATA TRANSPORT PROTOCOL FOR IEEE 1394 SERIAL BUS

(75) Inventors: Yuen Yu Leung; Shaun D. Pierce, both of Redmond, WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/272,059

(22) Filed: Mar. 18, 1999

Related U.S. Application Data

(62) Division of application No. 08/859,613, filed on May 20, 1997, now Pat. No. 5,938,752.

(51) Int. Cl.$^7$ .................................. G06F 13/38; G06F 3/00
(52) U.S. Cl. ........................ 710/126; 710/129; 710/101; 710/62
(58) Field of Search .................................. 710/129, 106, 710/126, 101, 130, 60, 100, 62, 63; 709/238, 201, 203, 300, 253; 395/712; 370/278, 912, 901, 908; 711/100

(56) References Cited

U.S. PATENT DOCUMENTS

| | | | |
|---|---|---|---|
| 4,570,220 | 2/1986 | Tetrick et al. | 395/306 |
| 5,504,757 | 4/1996 | Cook et al. | 370/468 |
| 5,632,016 | * 5/1997 | Hoch et al. | 710/30 |
| 5,748,911 | 5/1998 | Maguire et al. | 395/281 |

(List continued on next page.)

OTHER PUBLICATIONS

IEEE Standard Draft for the 1394 Serial Bus, 1995, pp. 19–33.

Technical Committee for Information Technology Standardization (NCITS) Working Draft for T10 Project 1155D, Revision 2b, Feb. 27, 1997.

"High and Mid Layer Protocols, DAVIC 1.0/1.1 Specifications, Part 7", Digital Audio Visual Council (DAVIC), Sep. 1995 & 1996, CD–ROM.

"High and Mid Layer Protocols, DAVIC 1.2 Specifications, Part 7", Digital Audio Visual Council (DAVIC), Dec. 1995, Sep./Dec. 1996.

"High and Mid Layer Protocols, DAVIC 1.2 Specification, Part 7", Digital Audio Visual Council 1995–1997.

(List continued on next page.)

*Primary Examiner*—Gopal C. Ray
(74) *Attorney, Agent, or Firm*—Lee & Hayes, PLLC

(57) ABSTRACT

A data transfer protocol encapsulates legacy transport protocols (e.g., TCP/IP, UDP/IP, IPX/SPX, etc.) for transfer of data over a memory mapped, high-speed serial bus conforming, to the IEEE 1394 standard. The data transfer protocol is implemented as a databus manager layer interposed between the 1394 bus and an existing network layer (e.g., SCSI, Ethernet, FDDI, token ring, etc.). A databus manager resides at every node on the 1394 bus. Each databus manager has an array of memory cells to temporarily hold discrete data units transferred over the serial bus from a remote node. Each databus manager also has a cell availability register and a cell servicing register. The cell availability register holds information indicating whether one or more remote memory cells at the remote node are available to receive a data unit to be transferred over the serial bus. The cell servicing register holds information indicating whether one or more of the local memory cells are ready to be serviced.

5 Claims, 7 Drawing Sheets

U.S. PATENT DOCUMENTS

| | | | |
|---|---|---|---|
| 5,764,930 | 6/1998 | Staats | 395/287 |
| 5,809,331 | 9/1998 | Staats et al. | 395/830 |
| 5,815,678 | 9/1998 | Hoffman et al. | 395/309 |
| 5,933,430 | 8/1999 | Osakabe et al. | 370/395 |
| 5,953,511 * | 9/1999 | Sescila, III et al. | |
| 5,991,842 | 11/1999 | Takayama | 710/105 |
| 6,006,289 | 12/1999 | James et al. | 710/35 |
| 6,038,628 * | 3/2000 | Leung et al. | |

OTHER PUBLICATIONS

"High and Mid Layer Protocols, DAVIC 1.3 Specifications, Part 7", Digital Audio Visual Council (DAVIC), 1995–1997, DAVIC 1.3 CD–ROM.

"High and Mid Layer Protocols, DAVIC 1.4 Specifications, Part 7", Digital Audio Visual Council (DAVIC), Jan. 1996–Jun. 1998.

"High and Mid Layer Protocols, Complete DAVIC Specifications, Part 7", Digital Audio Visual Council (DAVIC), Jan. 1996–Jun. 1999, CD–ROM.

Hattig, Myron, "IP and ARP Over IEEE 1394.1995", Intel Architecture Labs, Jan. 1997, pp. 1–7.

Hattig, Myron, "DAVIC Digital Audio–Visual Council", Intel Corporation, Dec. 13, 1996, pp. 3–9.

* cited by examiner

COMPUTER FOR ENCAPSULATING LEGACY DATA TRANSPORT PROTOCOL FOR IEEE 1394 SERIAL BUS

This is a divisional of U.S. patent application Ser. No. 08/859,613, filed May 20, 1997, which issued as U.S. Pat. No. 5,938,752, on Aug. 17, 1999.

TECHNICAL FIELD

This invention relates to data transfer protocols for a high speed serial bus, such as a serial bus that conforms to the IEEE 1394 standard. More particularly, this invention relates to systems, data structures, and methods implemented at nodes on the serial bus for encapsulating data packets from various legacy protocols and transferring those packets over the serial bus.

BACKGROUND OF THE INVENTION

IEEE 1394 specifies a standard for a high performance serial bus (hereinafter "1394 bus"). The 1394 bus uses a generic data transfer protocol to facilitate communication among nodes. One of the intended uses of the 1394 bus is to transfer data, and to be used in conjunction with legacy data transfer protocols. Using a legacy data transfer protocol and transport layer is advantageous because existing hardware and software already support them.

A problem arises in that the generic data transfer protocol employed by the 1394 bus is incompatible with all legacy data transfer protocols.

Accordingly, there is a need for a new data transfer protocol tailored for the 1394 bus that encapsulates legacy protocols for usage in conjunction with the 1394 bus.

SUMMARY OF THE INVENTION

This invention concerns a data transfer protocol for transferring data over the 1394 bus, regardless to which legacy protocol the data conforms.

According to an aspect of this invention, the data transfer protocol is implemented as a serial databus manager layer interposed between the 1394 bus and the existing network layer (e.g., SCSI, Ethernet, FDDI, token ring, etc.). The databus manager resides at every node on the 1394 bus. Each databus manager has an array of memory cells to temporarily hold discrete data units received from the serial bus. These data units might be, for example, data packets that are packaged according to a legacy protocol or segments of such data packets.

Each databus manager also has a cell availability register and a cell servicing register. The cell availability register holds information indicating whether one or more remote memory cells at a remote node are available to receive a data unit to be transferred over the serial bus. The cell servicing register holds information indicating whether one or more of the local memory cells contain data units that are ready to be serviced.

To transfer the data unit, the local databus manager examines its cell availability register to identify an available remote memory cell and sends the data unit over the 1394 bus to the available remote memory cell. The local databus manager updates its cell availability register to indicate that the remote memory cell to which the data unit is sent is no longer available. The local databus manager then sends a command to update the cell servicing register at the remote node to indicate that the remote memory cell to which the data unit is sent is ready to be serviced.

The remote databus manager services the remote memory cell and updates its cell servicing register to indicate that the remote memory cell is no longer ready for service. The remote databus manager then sends a command to update the cell availability register of the local databus manager to indicate that the remote memory cell is once again available to receive a new data unit.

BRIEF DESCRIPTION OF THE DRAWINGS

FIG. 6 shows the data structure at a state prior to the transfer of a data unit.

DETAILED DESCRIPTION OF THE PREFERRED EMBODIMENT

Figure 1:
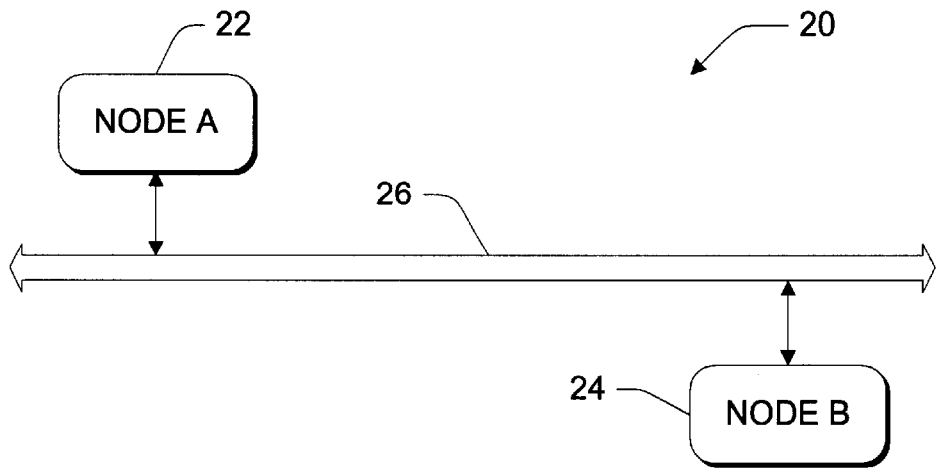
FIG. 1 is a diagrammatic illustration of a distributed computer system having computer nodes interconnected by a memory mapped high-speed serial bus.

FIG. 1 shows a distributed computer system 20 having multiple computing nodes 22 and 24 interconnected by a memory mapped high-speed serial bus 26. In the preferred implementation, the high speed serial bus 26 conforms to the specification of the IEEE 1394 standard. The nodes 22 and 24 represent various types of computing units, such as desktop computers, servers, laptop computers, network computers, and the like, as well as a group of networked computers. The nodes can also be various IEEE 1394 compliant devices such as printers, cable modems and the like.

Figure 2:
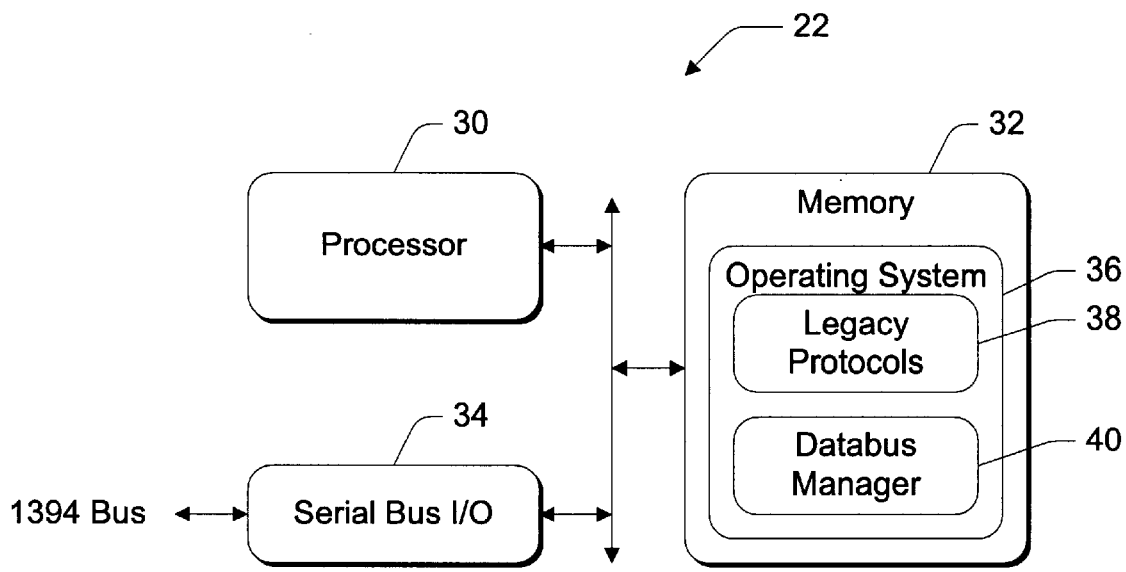
FIG. 2 is a block diagram of a computer node that is connected to the serial bus.

FIG. 2 shows an implementation of a computing node 22 implemented as a single computer. It includes a processor 30, a memory 32 (e.g., RAM, ROM, disk drive, PCMCIA, etc.) and a serial bus I/O 34. The serial bus I/O 34 is connected to the 1394 bus.

An operating system 36 is stored in memory 32 and executes on processor 30. The operating system is preferably a multitasking operating system that employs a graphical user interface windowing environment to present applications or documents. One preferred operating system is a Windows® brand operating system sold by Microsoft Corporation, such as Windows® 95, Window CE™, Windows NT™ or other derivative versions of Windows®. However, other operating systems may be employed, such as UNIX based operating systems.

Legacy transport protocols 38 are incorporated into the operating system 36. Examples of legacy transport protocols include TCP/IP, UDP/IP, IPX/SPX, and NetBEUI. A serial databus manager 40 is also incorporated into the operating system 36. The databus manager 40 encapsulates the legacy transport protocols for transfer over the 1394 bus. Although the legacy transport protocols 38 and databus manager 40 are shown incorporated into the operating system, they may be implemented in separate or standalone devices resident at the computing node 22.

Figure 3:
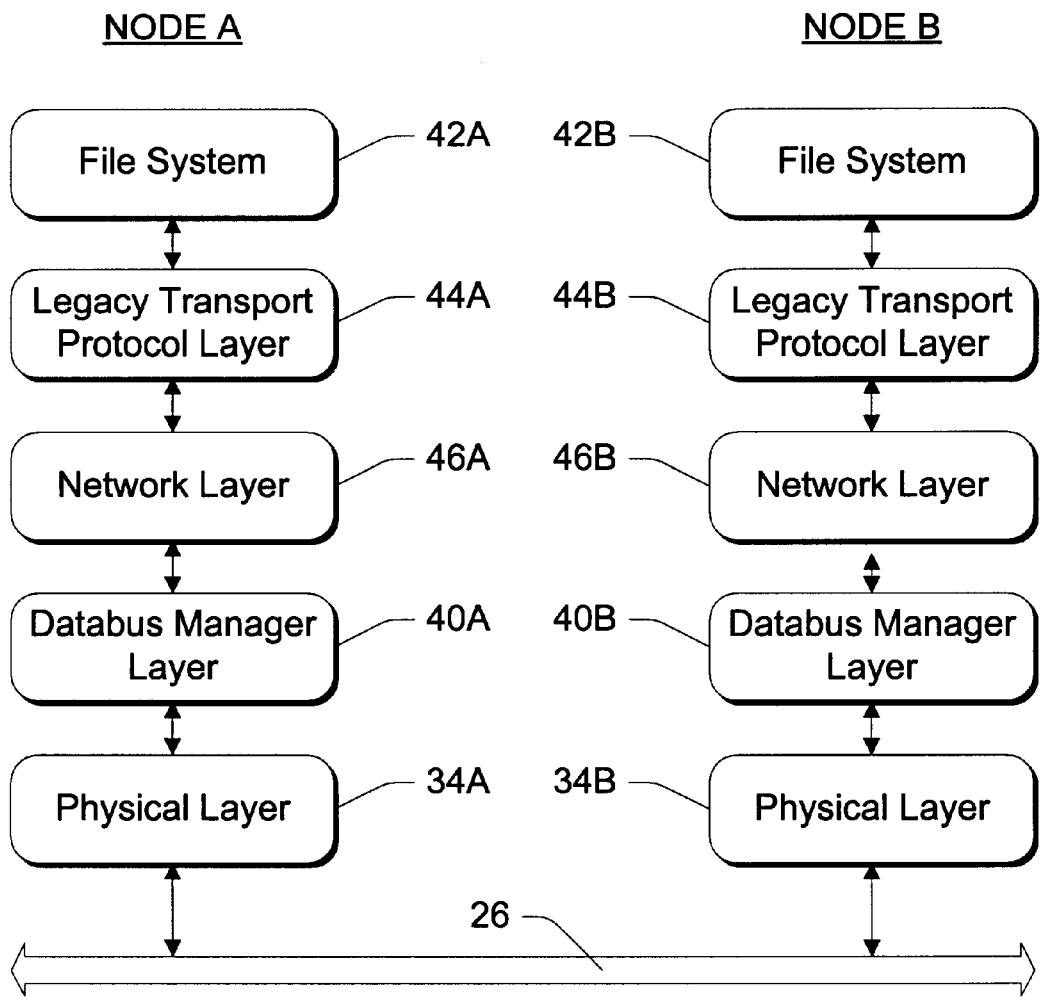
FIG. 3 is a block diagram of hardware and software network protocol architecture implemented at each computer node.

FIG. 3 shows a hardware/software architecture of the network protocol layers implemented at the nodes A and B. Each node contains the same hierarchic architecture. The top layer is the file system 42 of the operating system. At this layer, data exists as high level files that can be handled by applications running on the computers. For discussion purposes, the same components in FIG. 3 are generally described with a single number, such as file system layer "42", but the illustrated blocks are referenced with an extension of "A" or "B" to differentiate the nodes at which the components reside.

The legacy transport protocol layer 44 is interfaced with the file system 42 to break the data files into manageable packets that can be transferred over a network. As an example, the TCP/IP protocol breaks data into individual packets having a variable-length data payload, a fixed-length TCP (Transmission Control Protocol) header, and a fixed-length IP (Internet Protocol) header. The TCP/IP packets are handed to a network layer 46, which forms different sized packets suitable for transport over a particular type of network. For example, an Ethernet network supports fixed size packets of 1514 bytes.

The databus manager 40 is interfaced with network layer 46 to manage a physical exchange of the network packets over the 1394 bus. The network packets are held in a buffer or some other means in the network layer until the databus manager 40 moves them across the 1394 bus. The databus manager 40 moves the data as individual units, which may or may not be the same as the network packets. Depending on the size of the packet and the unit size supported by the serial bus, the databus manager 40 might move the entire packet across the serial bus, or divide the packet into segments and move them across the bus, or bundle packets into groups and move the groups across. The databus manager 40 may also add a header to the packet that specifies the size of the data unit. Alternatively, the databus managers connected to the bus may have a prearranged agreement as to the size of the data units.

The lowest layer is the physical layer 34, which interfaces the databus manager 40 and the 1394 bus 26. The physical layer 34 is concerned with transmitting raw bits over the serial bus 26.

To explain how the network architecture works, suppose computing node A wants to send a data file to computing node B using TCP/IP and Ethernet protocols. The legacy transport protocol layer 44A segments the data file received from file system 42A into discrete TCP/IP packets. The Ethernet layer 46A converts the TCP/IP packets to Ethernet packets. The databus manager 40A then manages the transfer of the Ethernet packets out through the physical layer 34A, over the 1394 bus, and to the corresponding physical layer 34B at computing node B. The databus manager 40B services the incoming packets by passing them to the Ethernet layer 46B, where they are converted back to TCP/IP packets. The transport protocol layer 44B takes the TCP/IP packets, checks for any errors, and reassembles the data file from the packets. The data file is then passed to the file system 42B.

Figure 4:
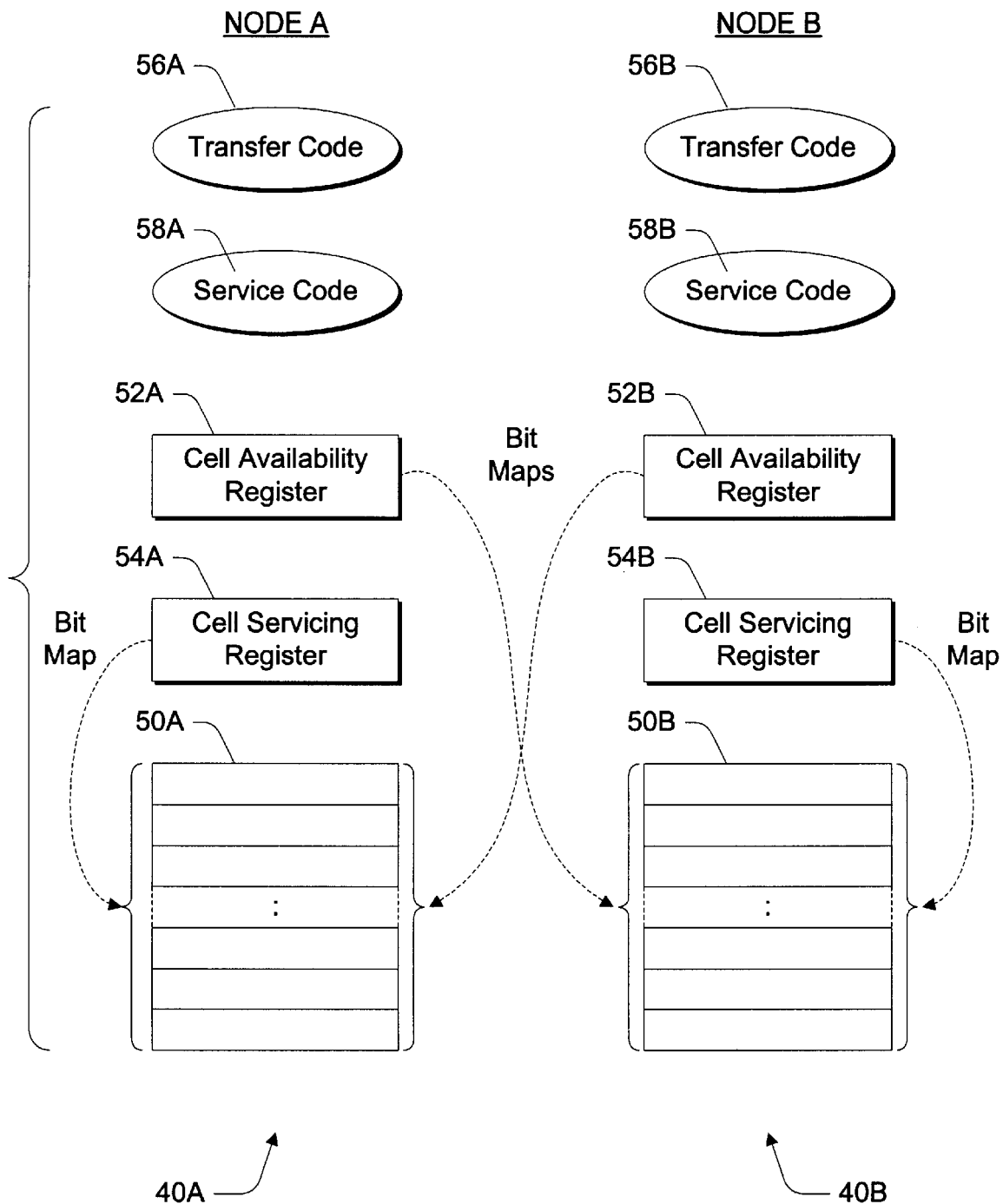
FIG. 4 is a block diagram of a databus manager implemented at each computer node.

FIG. 4 shows the databus manager 40 in more detail. A databus manager 40 is provided at each node on the 1394 bus, as represented by node A and node B. Each databus manager 40 has an array of memory cells 50 to temporarily hold the data units that are received from the 1394 bus. As an example, each array contains thirty-two or sixty-four memory cells. Each memory cell is of an arbitrary length, and can hold various size network packets. Adjacent memory cells need not be physically contiguous in memory. However, the memory within each cell is physically contiguous.

Each databus manager 40 has two registers: a cell availability register 52 and a cell servicing register 54. The registers can be implemented in hardware or as a data structure in software.

The cell availability register 52 holds information indicating whether one or more remote memory cells located at a remote node on the serial bus are available to receive data. That is, the cell availability register 52A for node A contains information indicating whether one or more remote memory cells 50B at node B are available to receive data. The cell availability register 52 preferably contains a bit map of the remote memory cells located at the remote node. The bit map contains a bit value for each corresponding remote memory cell that indicates whether the corresponding remote memory cell is available to receive a data unit. The dashed arrow between the cell availability register 52 and the remote memory cells 50 represents the bit mapping.

The cell servicing register 54 holds information indicating whether one or more local memory cells at the same node contain data that is ready to be serviced. That is, the cell servicing register 54A for node A contains information indicating whether one or more local memory cells 50A at the same node A are ready to be serviced. The cell servicing register 54 preferably contains a bit map of the local memory cells that contains a bit value for each corresponding local memory cell. The bit value indicates whether the corresponding local memory cell is ready to be serviced. In the described implementation, servicing in this context means passing the data packet in the memory cell up to the network layer. The dashed arrow between the cell servicing register 54 and the remote memory cells 50 represents the bit mapping.

Each databus manager 40 also has a computer-readable program for moving, the data in and out of the memory cells 50 and maintaining the registers 52 and 54. The computer-readable program is illustrated as two separate segments of code: a transfer code 56 and a service code 58. The transfer code 56 is configured to examine the cell availability register 52 to identify any available remote memory cells. If one exists, the transfer code 56 sends data over the serial bus the available remote memory cell. The transfer code 56 then updates the local cell availability register 52 to indicate that the remote memory cell to which the data is sent is no longer available. The transfer code 56 also informs the remote node the remote memory cell now contains data that needs to be serviced.

The service code 58 examines the local cell servicing register 54 to identify one or more of the memory cells that contain data that is ready to be serviced. The service code 58 services any identified memory cell and updates the cell servicing register 54 to reflect that the identified memory cell is no longer ready for service. The service code 58 also informs the sender of the data that the serviced memory cell is once again available to receive new data.

The above explanation assumes a system with only two nodes, for convenience of discussion. For systems having more than two nodes, the databus manager maintains a set of cell availability and cell servicing registers and an array of cells for each remote node on the bus.

Figure 5:
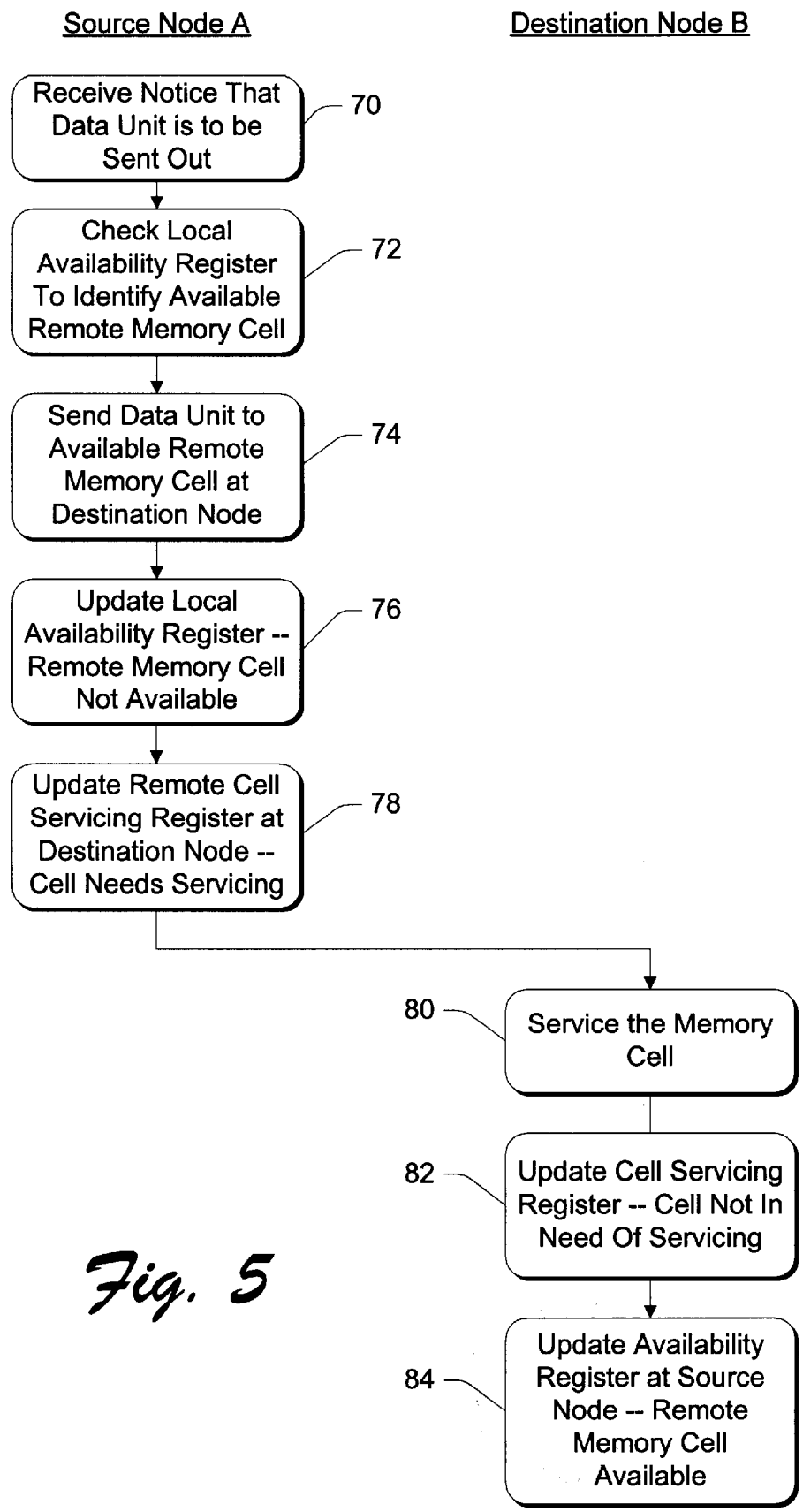
FIG. 5 is a flow diagram of steps in a method for transferring data over the serial bus.
Figure 6:
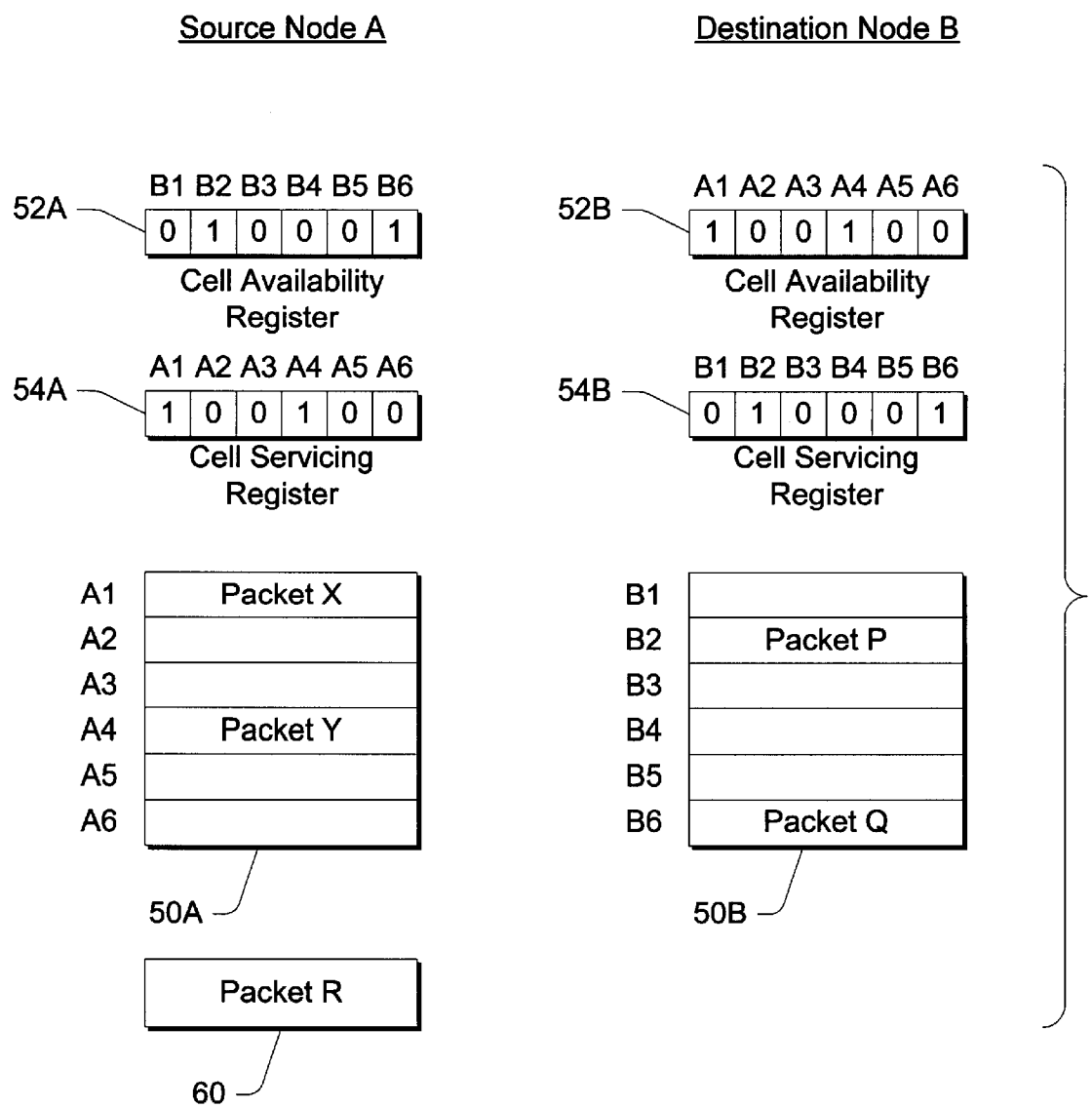
FIG. 6 is a diagrammatic illustration of a data structure employed in the databus manager to accommodate the transfer of data over the serial bus.
Figure 7:
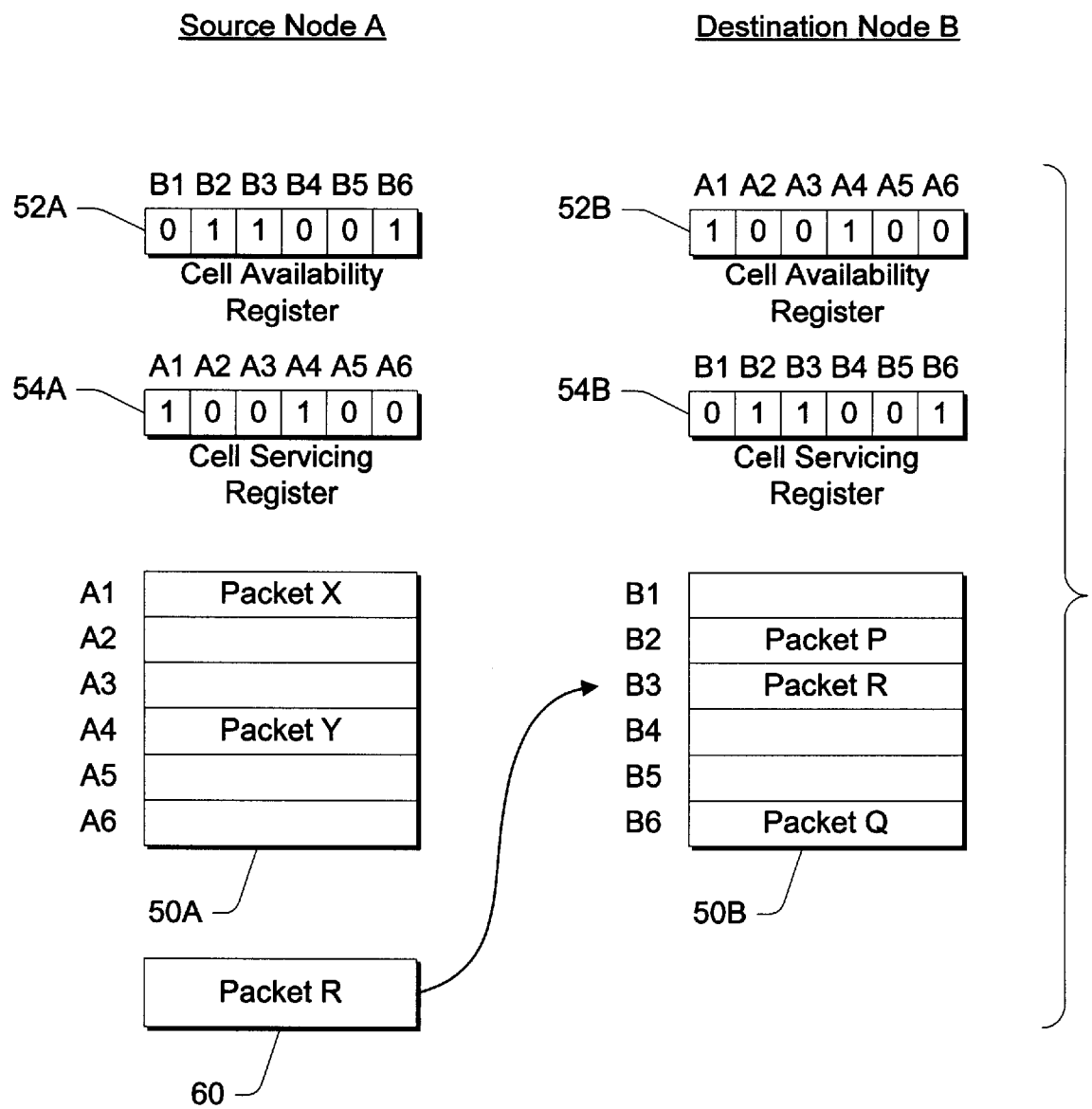
FIG. 7 is a diagrammatic illustration of the FIG. 6 data structure at a state after a data unit is transferred over the serial bus.
Figure 8:
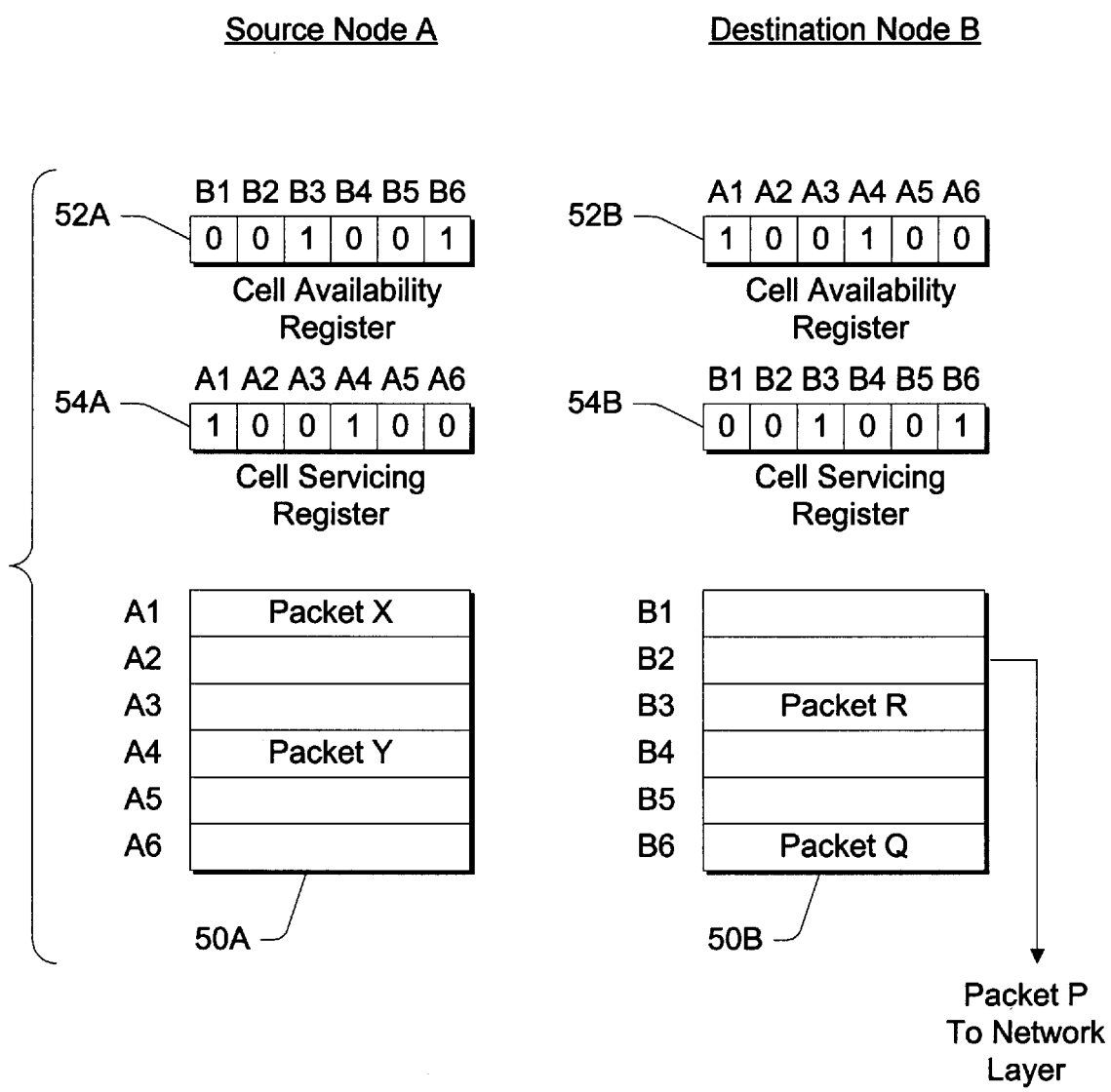
FIG. 8 is a diagrammatic illustration of the FIG. 6 data structure at a state after a transferred data unit is serviced.

FIGS. 5–8 show a method for transferring data over a memory mapped serial bus, such as the 1394 bus, from a source node A to a destination node B. The steps of FIG. 5 are discussed in the context of the data structures at the two nodes, which are shown in FIGS. 6–8 at different phases of the transfer process.

The process begins when the databus manager 40A at source node A receives notice that a data packet (say, data packet R) is in the network buffer 60 and ready to be transmitted over the serial bus (step 70 in FIG. 5). The source databus manager 40A checks its cell availability register 54A to identify any memory cell located at the destination node B that is available to receive a data unit (step 72 in FIG. 5).

FIG. 6 shows the registers and memory cells at this point. Two packets X and Y are located in memory cells A1 and A4 of memory array 50A, and two packets P and Q are located in memory cells B2 and B6 of memory array 50B. At the source node A, the cell availability register 52A shows that the remote memory cells B2 and B6 are not available, as represented by the asserted "1" bit in the corresponding bit map. The binary "0" value in the cell availability register 52A indicates that the memory cells B1, B3, B4 and B5 at destination node B are available to receive data. Of course, a different logic arrangement may be used, such as setting a "1" bit when the remote cell is available and resetting a "0" bit when the remote cell is not available. The cell servcing register 54A indicates that local memory cells A1 and A4 of the local memory array 50A are ready to be serviced.

Similarly, at the destination node B, the cell availability register 52B shows that memory cells A1 and A4 at source node A are not available to receive data and that the memory cells A2, A3, A5 and A6 at source node A are available to receive data. The cell servicing register 54B at node B indicates that memory cells B2 and B6 of the memory array 50B are ready to be serviced.

Suppose that the source databus manager 40A identifies remote memory cell B3 at destination node B as being available to receive the data packet R. The transfer code of databus manager 40A sends the data packet R from buffer 60 over the 1394 bus to the available remote memory cell B3 (step 74 in FIG. 5). More particularly, this is done by writing, the data packet to the address of memory cell B3 at destination node B.

FIG. 7 shows the packet R being, written to memory cell B3. At this point, memory cell B3 is no longer available to receive data. Accordingly, the source databus manager 40A updates its cell availability register 52A to reflect that the destination memory cell is no longer available (step 76 in FIG. 5). This is done by changing the bit value in register space B3 of register 52A, which corresponds to the destination remote memory cell B3, from a binary "0" to a binary "1".

The source databus manager 40A also updates the cell servicing register 54B at the destination node B to reflect that the destination memory cell B3 is ready to be serviced (step 78 in FIG. 5). This is done by changing the bit value in register space B3 of cell servicing register 54B from a binary "0" to a binary "1".

If packet R is larger than the maximum size supported by the 1394 bus, its is segmented and sent sequentially to a cell. The first segment of packet R is sent to the beginning of cell B3. The next segment is sent to the end of the first segment in cell B3, and so forth. This negates having, a higher level protocol describe which segment is currently being sent and where to put them. To guarantee that the destination node has received the entire packet, the local databus manager updates the remote cell availability register only after the destination databus manager has received all segments of the packet.

For purposes of continuing discussion, suppose that the databus manager 40B at the destination node B decides to service the data packet P, which is located in memory cell B2 and has been in the memory array the longest. This servicing policy is a first-in-first-out (FIFO) policy, although the databus manager 40B can service the packets according to other policies. The destination databus manager 40B services the memory cell B2 by passing the packet P onto the network layer (step 80 in FIG. 5). The data packet P is thus written out of memory cell B3.

It is noted that if the sequence of packets is critical, the packets can be written into adjacent memory cells in order and serviced in order by the databus manager.

FIG. 8 shows the data structure after memory cell B3 is serviced by writing the data packet P to the buffer in the network layer. The destination databus manager 40B updates its cell servicing register 54B to reflect that the memory cell B2 no longer requires servicing (step 82 in FIG. 5). This is done by changing the bit value in register space B2 of cell servicing register 54B from a binary "1" to a binary "0". The destination databus manager 40B also updates the cell availability register 52A at source node A to reflect that the destination memory cell B2 is once again available to receive data (step 84 in FIG. 5). This is done by changing the bit value in register space B2 of cell availability register 52A from a binary "1" to a binary "0".

The data transfer protocol described above is advantageous because it requires no knowledge of what data is being transferred to the memory cells of a remote node, nor who the intended recipient is within that node, nor what the underlying hardware architecture is at that node. The protocol provides the facility to transfer any length packet between nodes on the bus. The higher layers in the network architecture can determine what appropriate action is to be taken for the transferred packet.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

We claim:

1. A computer for transferring data over a memory mapped serial bus from a source node to a destination node, the computer comprising:

a processor: and code that, when executed on the processor, causes the computer to:

identify a memory cell located at the destination node that is available to receive data;

send the data over the serial bus to the available memory cell at the destination node;

update a register to reflect that the memory cell at the destination node is no longer available; and inform the destination node that the memory cell contains the data.

2. A computer as recited in claim 1, where in the code further causes the computer to update the register when the data has been handled at the destination node.

3. For transferring data units over a memory mapped serial bus that conforms to an IEEE 1394 standard from a source node to a destination node wherein each said node has an array of local memory cells to temporarily hold the data units, a cell availability register that holds information indicating whether one or more remote memory cells located at a remote node on the serial bus are available to receive a data unit, and a cell servicing register that holds information indicating whether one or more of the local memory cells contain a data unit that is ready to be serviced, a distributed computer system comprising:

first and second processors at the source and destination nodes, respectively; and code that, when executed on the first and second processors, causes the computer system to;

examine the cell availability register at the source node to identify a destination memory cell located at the destination node that is available to receive a data unit;

send the data unit from the source node over the serial bus to the destination memory cell;

update the cell availability register at the source node to reflect that the destination memory cell is no longer available;

update the cell servicing register at the destination node to reflect that the destination memory cell is ready to be serviced;

service the destination memory cell at the destination node;

update the cell servicing register at the destination node to reflect that the destination node is no longer ready to be serviced; and update the cell availability register at the source node to reflect that the destination memory cell at the destination node is once again available to receive a data unit.

4. A distributed computer system as recited in claim 3, wherein the cell availability register contains a bit map of the remote memory cells located at the remote node and the bit map indicates whether the remote memory cells are available, the code further causing the computer system to update the cell availability register by changing, a bit value in the bit map that corresponds to the destination memory cell.

5. A distributed computer system as recited in claim 3, wherein the cell servicing register contains a bit map of the local memory cells and the bit map indicates whether the local memory cells are ready to be serviced, the code further causing the computer system to update the cell servicing register by changing, a bit value in the bit map that corresponds to the destination memory cell.

* * * * *